United States Patent
Wang et al.

(10) Patent No.: US 7,839,292 B2
(45) Date of Patent: Nov. 23, 2010

(54) REAL-TIME DRIVING DANGER LEVEL PREDICTION

(75) Inventors: Jinjun Wang, San Jose, CA (US); Wei Xu, Los Gatos, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 212 days.

(21) Appl. No.: 11/950,765

(22) Filed: Dec. 5, 2007

(65) Prior Publication Data
US 2009/0040054 A1  Feb. 12, 2009

Related U.S. Application Data

(60) Provisional application No. 60/911,092, filed on Apr. 11, 2007.

(51) Int. Cl.
G08B 23/00  (2006.01)

(52) U.S. Cl. .................... 340/576; 340/573.3; 340/441; 340/479

(58) Field of Classification Search ................ 340/576, 340/573.3, 435, 436, 438, 439, 441, 444, 340/443, 465, 466, 479
See application file for complete search history.

(56) References Cited

U.S. PATENT DOCUMENTS

| 5,488,353 A * | 1/1996 | Kawakami et al. .......... 340/576 |
| 5,585,785 A * | 12/1996 | Gwin et al. ................. 340/575 |
| 5,786,765 A * | 7/1998 | Kumakura et al. .......... 340/576 |
| 6,130,617 A | 10/2000 | Yeo |
| 6,599,243 B2 * | 7/2003 | Woltermann et al. ........ 600/300 |
| 2007/0244606 A1 * | 10/2007 | Zhang et al. ................... 701/1 |

OTHER PUBLICATIONS

Federal Highway Administration: Perclos: a valid psychophysiological measure of alertness as assessed by psychomotor vigilance; Oct. 1998.*
Qiang Ji et al., "Real Time Nonintrusive Monitoring and Prediction of Driver Fatigue", IEEE Transactions on Vehicular Technology, Jul. 2004, vol. 53, No. 4, pp. 1052-1068.
W. Shih and Liu, "A calibration-free gaze tracking techniques," Proc. of ICPR'OO, pp. 201-204, 2000.
Y. Matsumoto and A. Zelinsky, "An algorithm for real-time stereo vision implementation of head pose and gaze direction measurements," Proc. of IEEE Int'l. Conf. on Face and Gesture Recognition (ICFGR) '00, pp. 499-505, 2000.
J.Healeyand R. Picard, "Detecting stress during real-world driving tasks using physiological sensors," IEEE Trans. on Intelligent Transportation System, 2005.
Ueono et al, Development of Drowsiness Detection System, 1994 Vehicle Nav & Inf. Sys. Conf. Proceedings.
D. D, "F. perclos: A valid psychophysiological measure of alertness as assesed by psychomotor vigilance," Federal Highway Administration. Office of. Motor Carriers, pp. FWHA-MCRT-98-006, 1998.

(Continued)

*Primary Examiner*—Daniel Previl
(74) *Attorney, Agent, or Firm*—Joseph Kolodka; Bao Tran

(57) ABSTRACT

Systems and methods are disclosed to predict driving danger by capturing vehicle dynamic parameter, driver physiological data and driver behavior feature; applying a learning algorithm to the features; and predicting driving danger.

18 Claims, 10 Drawing Sheets

The driving danger level prediction prototype

OTHER PUBLICATIONS

Author Unknown, Proposed Driver Workload Metrics and Methods Project. 2007.

Q. Ji and X. Yang, "Real-time eye, gaze and face pose tracking for monitoring driver vigilance," Real-time Imaging, pp. 357-377, 2002.

Ji et al, Real-Time Nonintrusive Monitoring and Prediction of Driver Fatigue, IEEE Transactions on Vehicular Technology, vol. 53, No. 4, Jul. 2004.

L. Bergasa, J. Nuevo, M. Steloand, R. Barea, and M. Lopez, "Real-time system for monitoring driver vigilance," IEEE Trans. on Intelligent Transportation System, No. 1, pp. 63-77, 2006.

Wong et al, "Rule based anomaly pattern detection for detecting disease outbreaks", AAAI, 2002.

J. Healey and R. Picard, "Smatcar: Detecting driver stress," Proc. of ICPR'OO, pp. 218-221, 2000.

Singliar et al, "Towards a Learning Traffic Incident Detection System" Proc. Of the Workshop on Machine Learning Algorithms for Surveillance and Event Detection, 2006.

* cited by examiner

REAL-TIME DRIVING DANGER LEVEL PREDICTION

The present application claims priority to Provisional Application Ser. No. 60/911,092, filed Apr. 11, 2007, the content of which is incorporated by reference.

The present invention relates to driving danger prediction.

BACKGROUND

The availability of on-board electronics and in-vehicle information systems has demanded the development of more intelligent vehicles. One such important intelligence is the possibility to evaluate the driving danger level to prevent potential driving risks. Although protocols to measure the driver's workload have been developed by both the government and industry, such as eye-glance and on-road metrics, they have been criticized as too costly and difficult to obtain. In addition, existing uniform heuristics such as the 15-Second for Total Risk Time, do not account for the changes in individual driver's and vehicle's environment. Hence understanding the driver's and the vehicle's frustration to prevent potential driving risks has been listed by many international companies as one of the key area for improving intelligent transportation systems.

In the past decades, most reported work sought to discovery effective physiological and bio-behavioral measures to detect the diminished driver vigilance level due to stress, fatigue or drowsiness to prevent potential risks. The most accurate techniques for monitoring human vigilance level is based on physiological features like brain waves, heart rate, blood volume pulse and respiration. Examples based on physiological measure include the ASV (Advanced Safety Vehicle) system and the SmartCar project from MIT. However, acquiring physiological data is intrusive because some electrodes or sensors must be attached to the drivers, which causes annoyance to them. For example, to obtain the electroencephalograph signal (EEG) for "Mind Switch" technique, a head-band device must embedded with electrodes to make contact with the driver's scalp so as to measure the brain waves. Good results have also been reported with techniques that monitor pupil response, eye blinking/closure/gaze and eyelid/face/head movement using head-mounted devices. These techniques, though less intrusive, are still not practically acceptable.

To develop non-intrusive driving risk monitoring and alerting system, two sets of features are available. The first is to monitor the drivers' visual behavior using remote camera(s) and apply computer vision techniques to extract features that are correlated to their fatigue state. For example, the driver's head pose and face direction were recognized from multiple camera using 3D stereo matching or from single camera using template matching. In one head/eye tracking system, a single camera monitors driver's drowsiness level. To cope with different lighting condition, infrared LED is used for illumination. To reduce uncertainty or ambiguity from single visual cue, multiple visual features could be utilized to improve accuracy and reliability.

However, systems relying on visual cues may exhibit difficulty when the required visual features cannot be acquired accurately or reliably. For example, drivers with sun glasses could pose serious problem to those techniques based on detecting eye characteristics. Although multiple visual cues can be combined systematically, how to select suitable model to fuse these features to improve the overall accuracy remains challenging. Hence another set of non-intrusive features based on the vehicle's dynamic state have been examined, such as lateral position, steering wheel movement, throttle acceleration/break deceleration, etc. In fact, the vehicle' dynamic state is a direct reflection of the state of the driving, while researches focusing on modeling driver's vigilance have assumed the close correlation between fatigue/stress and driving danger. Hence many researchers used this set of features for driver safety monitoring. Some important examples include the Spanish TCD (Tech. Co. Driver) project and the ASV system. However, although the extraction of these vehicle's dynamic parameters can be blind to the driver, it is argued that their quality is subjected to the vehicle type, driver experience, geometric characteristics, state of the road, etc limitations.

On the other hand, from a pattern recognition point of view, the task of predicting current driving danger level can be regarded as an anomaly detection problem. Anomaly detection has many important real-world applications, ranging from security, finance, biology, manufacturing and astrophysics, each domain with a huge volume of literature. To detect anomaly in simple scenario, the rule-based methods can be used where any violation of the rule(s) is regarded as an anomaly. For example, a complex rule-based approach has been used to characterize the anomalous pattern for disease outbreak detection. Each rule is carefully evaluated using Fisher's Exact Test and a randomization test. For more complex anomaly detection task such as driver danger level prediction in this paper, defining rules becomes extreme difficult. Hence many other researches applied statistical modeling methods for anomaly detection. For example, the Fisher projection and linear classifier can model the low/medium/high stress level using physiological features. A newly coming data was classified using the Bayesian approach. In another example, a two-category classifier using SVM classifies the incoming data as normal or anomalous. However, these methods overlooked the spatial correlation between features. To cope with the limitation, the Bayesian Network can fuse different features for inference.

SUMMARY

Systems and methods are disclosed to predict driving danger by capturing vehicle dynamic parameter, driver physiological data and driver behavior feature; applying a learning algorithm to the features; and predicting driving danger.

Implementations of the above systems and methods may include one or more of the following. The learning algorithm includes one of: Hidden Markov Model, Conditional Random Field and Reinforcement Learning. The vehicle dynamic parameter includes one or more of: driver's lateral lane position, steering wheel angle, longitudinal acceleration, longitudinal velocity, distance between vehicles. The driver's physiological data includes one or more of: respiration, heart rate, blood volume, skin temperature, skin conductance. The driver behavior feature can be a PERCLOSE feature. The driver behavior feature can capture fatigue, vision, distraction. The method includes training the learning algorithm and performing off line cross-validation. The system can predict driving danger in real time. The system can communicate a reason that caused it to predict driving danger to help a user understand the risk(s).

Advantages of the above systems and methods may include one or more of the following. The system can use one or more features to dynamically monitor the vehicle and the driver during driving, specifically the vehicle dynamic parameters, the driver's physiological data and the driver's behavior. The system uses the vehicle dynamic parameter features which serve as a highly informative feature for driving danger level prediction in a real-time system. To discover the temporal patterns that lead to safe/dangerous driving situation, sequential learning algorithms such as Hidden Markov Model, Random Field, and Reinforcement Learning can be used with the Reinforcement Learning based method using non-linear value function achieves best results during cross-validation. The resulting live danger level prediction system gives real-time danger prediction for the driver to prevent a set of potential risks, including speed exceedance, sudden acceleration/deceleration/turning, off-road, crash with cars or pedestrian, among others. The real time danger prediction provides an automated driving assistant, leading to a safer driving environment.

DESCRIPTION

Figure 1:
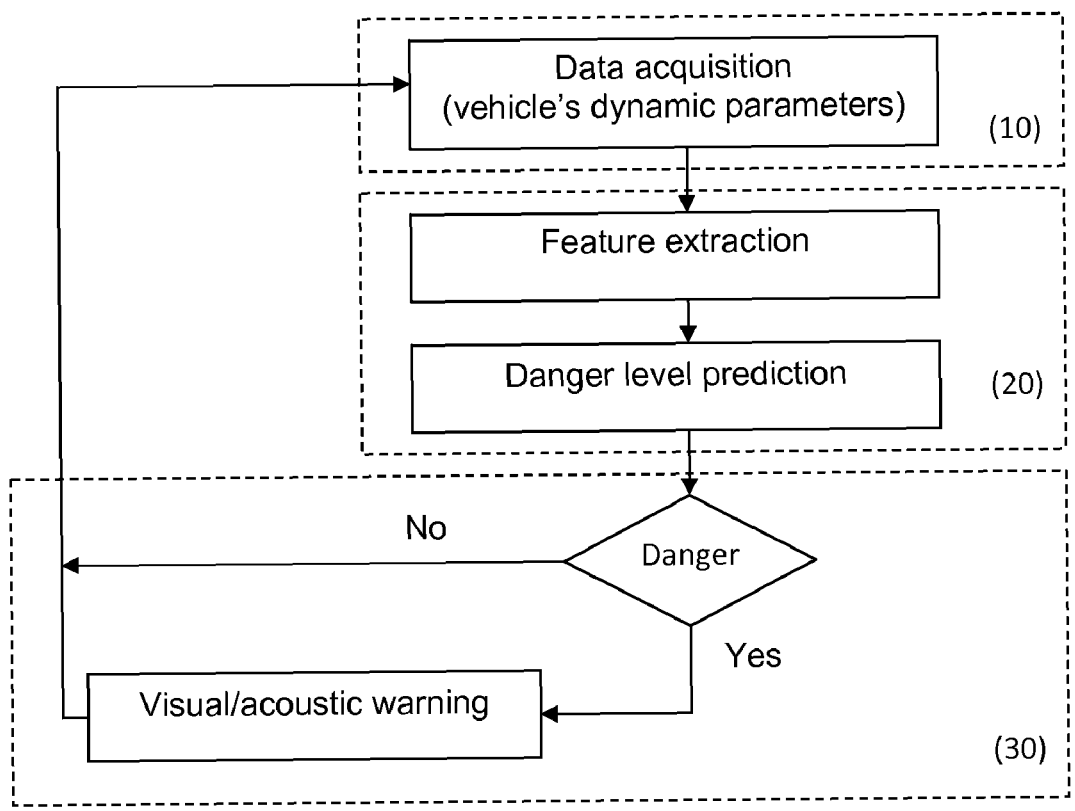
FIG. 1 shows one exemplary process for a driving danger level prediction system.

FIG. 1 shows one exemplary process for a driving danger level prediction system. First, the process collects driving condition data from a plurality of sensor inputs (10). The system uses multiple sensor inputs and statistical modeling to predict the driving risk level. In one implementation, three types of features were collected, specifically the vehicle dynamic parameters, the driver's physiological data and the driver's behavior feature. Next, to model the temporal patterns that lead to safe/dangerous driving state, one or more sequential supervised learning algorithms are used, including Hidden Markov Model, Conditional Random Field and Reinforcement Learning (20). In the preferred embodiment, Reinforcement Learning based method with the vehicle dynamic parameters feature is used to predict risk level. In another embodiment, Reinforcement Learning is used with the other two features to further improve the prediction accuracy. Finally, if the process detects dangerous driving conditions, alarms can be generated to help the driver recover from the danger (30).

In a live driving danger level prediction embodiment, vehicle dynamic parameters feature are applied to the Reinforcement Learning module. The system analyzes the sensor readings and outputs a numerical danger level value in real-time. When a predefined threshold based on training data is exceeded, acoustic warning is sent to the driver to prevent potential driving risks. Compared to many previous researches that focused on monitoring the driver's vigilance level to infer the possibility of potential driving risk, the live system is non-intrusive to the driver, and hence highly desirable for driving danger prevention applications. In this driving prediction embodiment, the system consists of three major modules: 1) The data acquisition module that captures the vehicle's dynamic parameters and driver behaviors in real-time; 2) The feature extraction that converts the raw sensor readings into defined statistical features as described above; and 3) The danger level prediction module that uses the Reinforcement Learning algorithm to generate a numerical danger level score. The score is used to trigger the warning interface if a predefined threshold learned from training samples is exceeded.

The system captures the driver's physiological data, the driver's visual behavior and the vehicle's dynamic state. With respect to the Driver's Physiological Data ($F_1$), although a driver's knowledge, skill, perceptual and cognitive abilities is almost constant during any driving session, the driver's behavior is a critical risk-increasing factor. A driver's behavior is affected by fatigue, poor vision, major distraction, etc condition, and is reflected in the variation of his/her physiological data. Hence, the physiological data provides the most accurate techniques for monitoring driver's vigilance level. In one embodiment, a physiological sensing system called "FlexComp Infiniti" from Thought Technology connects five sensors to the driver, and recorded the sensor readings at the terminal in a continuous way without interrupting the user (FIG. 1). Each sample from FlexComp Infiniti is denoted as $F_1$ which is an $R^9$ column vector. Table 1 lists the physical meanings of each exemplary dimension of $F_1$.

TABLE 1

| Driver's Physiological Data ($F_1$) | |
|---|---|
| ID | Description |
| 1 | Respiration pro/flex on stomach |
| 2 | Heart Rate/Blood Volume Pulse pro/flex |
| 3 | Skin temperature pro/flex |
| 4 | Skin Conductance pro/flex |
| 5 | Blood Volume Pulse amplitude |
| 6 | Inter-Beat Interval from Blood Volume Pulse |
| 7 | Heart Rate Max-Heart Rate Min |
| 8 | Respiration amplitude |
| 9 | Respiration period |

As to the Driver's Visual Behavior ($F_2$), although the driver's physiological data gives important information about the wearer's drowsy, fatigue, emotional, etc states, its acquisition is intrusive to the wearer. Hence people have been searching for other physiological indicators that can be collected non-intrusively to the driver. In this line there are many researches using computer vision based techniques to analyze the drivers' visual behavior to infer their physiological state. Reported visual behavior features include head orientation, eye movement, eyelid closure rate, etc.

In one embodiment, the percentage of eye closure feature (PERCLOSE) is used because firstly, it's closely related to the driver's physiological state. For example, when people begin to drowse, their eye-blinks slow down, and there are fewer of them whose eyes stay closed for a longer time. Secondly and more importantly, with certain equipment, the PERCLOSE feature can be extracted very reliably. In one embodiment, the "Eye Alert Fatigue Warning System") from EyeAlert, Inc., is used to collect the PERCLOSE feature. The extracted PERCLOSE feature can be denoted as $F_2$ which is an $R^6$ column vector. Table 2 gives the meaning of each dimension of $F_2$.

TABLE 2

Driver's Percentage of Eyelid Closure (PERCLOSE, ($F_1$))

| ID | Description |
| --- | --- |
| 1 | The number of eyes found |
| 2 | Perclose calculated over a 1 minute period |
| 3 | Perclose calculated over a 3 minute period |
| 4 | Perclose calculated over a 5 minute period |
| 5 | Driver selected sensitivity setting |
| 6 | Adaptive threshold calculated for eye detection algorithm |

The third set of features collected is the vehicle's dynamic parameters ($F_3$), including speed, acceleration/deceleration, steering angle, lane position, etc physical data from the vehicle. The advantages of using the vehicle's dynamic data are firstly, collecting vehicle dynamic data is non-intrusive to the driver, and secondly, the dynamic data is a direct reflection of the vehicle's state, hence it's more sensitive to the change of driving danger level due to either the changes of driver's physiological state or the vehicle/environment condition. In the study, the vehicle dynamic parameters are collected from a driving simulator called "STISIM" by Systems Technology, Inc. STISIM is a PC based interactive driving simulator that allows the user to control all aspects of driving such as throttling, breaking and steering. The whole system includes a computer with the STISIM software, a projector displaying the driving scenarios, a steering wheel, and brake and throttle pedals. The driving scenario, including weather, road condition, traffic light/sign, pedestrian, buildings and so on, was carefully designed to make the simulation as close to reality as possible. During simulation, "STISIM" outputs the vehicle's dynamic parameters simultaneously. The set of features can be denoted as $F_3$, and Table 3 lists the 7 selected parameters.

TABLE 3

Vehicle Dynamic Parameters ($F_3$)

| ID | Description |
| --- | --- |
| 1 | Driver's lateral lane position with respect to the roadway dividing line, positive to the right (feet). |
| 2 | Steering wheel angle input |
| 3 | Longitudinal acceleration due to the throttle |
| 4 | Longitudinal acceleration due to the brakes |
| 5 | Driver's longitudinal velocity |
| 6 | Steering input counts |
| 7 | Minimum range (feet) between the driver and all vehicles in the driver's direction |

Next, the process to derive Statistical Features is discussed. Although the $F_1$, $F_2$ and $F_3$ data are all time-stamped for synchronization, they are of different sample rate (32, 3 and 30 samples per second, respectively). In addition, dropped samples are detected. Hence to synchronize $F_1$, $F_2$ and $F_3$, the following statistical features are derived using a fixed sliding window size $T_w$ and step size $T_s$:

[F;ΔF;$F^2$;$Δ^2$F]

where F=[max($F_n$),min($F_n$),mean($F_n$),variance($F_n$)] and n can be any combination of 1, 2 and 3. The max, min, mean and variance operators measure the corresponding statistics over all the samples in the window.

With the obtained feature sequences, the next system module uses sequential supervised learning algorithms to mine the specific patterns for the driving risk prediction task.

Next, the Sequential Supervised Learning process will be discussed. The problem of discovering feature patterns that result in safe/dangerous landing from continuous sensors readings can be regarded as a supervised learning problem. In addition, it is believed that any dangerous situation, e.g. crash, is caused by a sequence of actions rather than a single action. Hence there exists both short-term and long-term interactions between features, and thus the danger level prediction problem can be better modeled as a sequential supervised learning problem. There are many algorithms that are suitable for the problem, such as Recurrent Sliding Windows, Maximum Entropy Markov Models, etc. Three algorithms: Hidden Markov Model, Conditional Random Field, and Reinforcement Learning, have been used.

The Hidden Markov Model (HMM) based classifier has the ability to model both the generative patterns of any single hidden state and the temporal transition patterns across different states. HMM has been proved robust and accurate for many problems, such as Automatic Speech Recognition, image processing, communications, signal processing, finance, traffic modeling, etc.

To apply HMM for the problem, two HMMs were trained for the safe and dangerous sequences respectively. The HMM classifier works in the following manner: Given a set of states $S=\{s_1, s_2, \ldots, s_K\}$ and an observation sequence $X=\{x_1, x_2, \ldots, x_N\}$, the likelihood of X with respect to a HMM with parameters $\Theta$ expands as $p(X|\Theta)$ and:

$$p(X \mid \Theta) = \sum_{all\ Q} p(X, Q \mid \Theta)$$

where $$p(X, Q \mid \Theta) = p(X \mid Q, \Theta) p(Q \mid \Theta) \quad \text{(Bayes)}$$

Then $$p(X \mid Q, \Theta) = \prod_{n=1}^{N} p(x_n \mid q_n, \Theta)$$

$$= b_{q_1 x_1} \cdot b_{q_2 x_2} \cdot \ldots \cdot b_{q_N x_N}$$

and $$p(Q \mid \Theta) = \pi_i \cdot \prod_{n=1}^{N-1} a_{q_n q_{n+1}}$$

$Q=\{q_1, q_2, \ldots, q_N\}$ is a (hidden) state sequence where each $q_i \in S$; $\pi_i = p(q_1 = s_i)$ is the prior probabilities of $s_i$ being the first state of a state sequence; $a_{ij}$ denotes the transition probabilities to go from state i to state j, and $b_{q_i x_i}$ is the emission probabilities. $b_{q_i x_i}$ is modeled by Gaussian Mixture Model.

Figure 2:
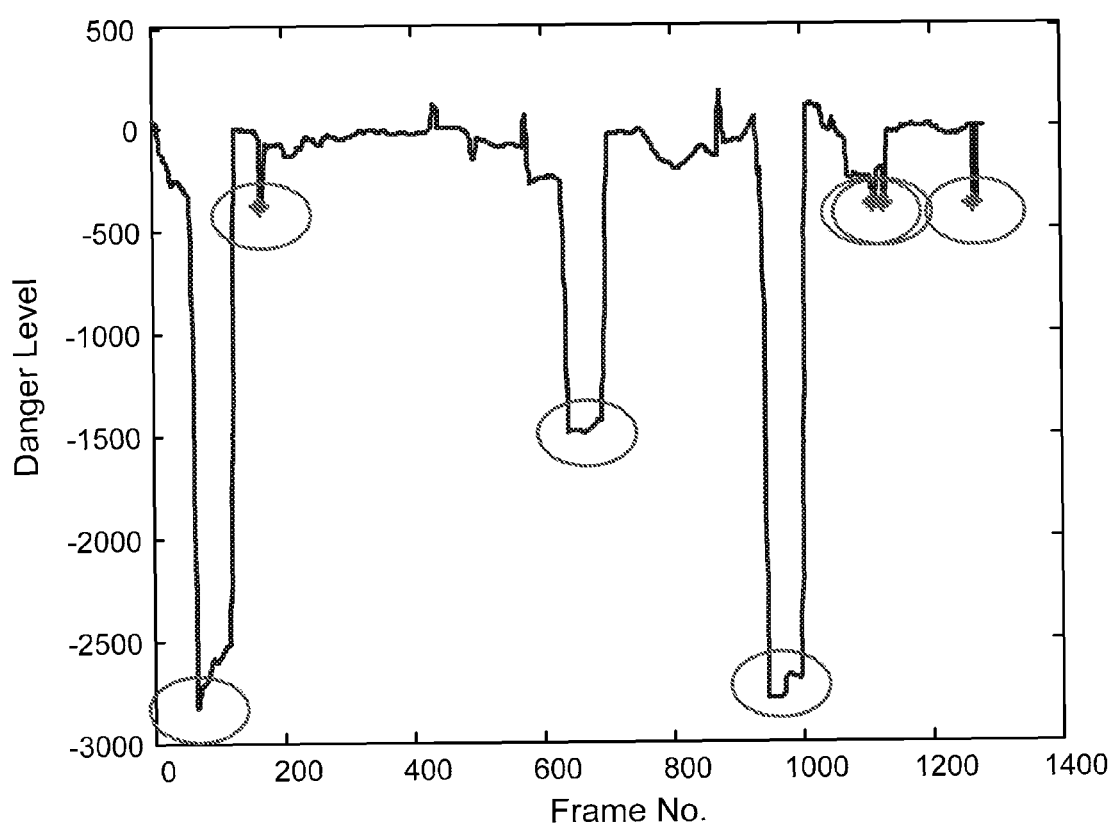
FIG. 2 shows an exemplary danger level curve generated using a Hidden Markove Model method.

During the danger level prediction phase, the whole input feature vector sequence is segmented into smaller sequences (frames) with fixed length and step size. Each frame of features are fed to both the "safe" and "crashed" HMMs. The danger level DL at time t is selected to be the logarithm likelihood of the frame being generated by the "crashed" HMM over that generated by the "safe" HMM, which is computed as follows:

$$DL_t = \log(p(X_t | \Theta_{crashed})) - \log(p(X_t | \Theta_{safe}))$$

where $X_t$ is the observed frame at time t, $\Theta_{crashed}$ is the parameters of the "crashed" HMM, and $\Theta_{safe}$ the parameters of the "safe" HMM. Ideally, the danger level DL during the driving should remain constant for most of the time, and drop before instances of danger. FIG. 2 shows a computed danger level curve for a 21 minutes long sequence. There are 7 computed dangerous points as indicated by red circles. When playing back the driving session, it is found that 4 out of the 7 points are crashes, and the rests are also dangerous situations such as sudden break, close to pedestrian, etc.

However, as a generative model, each observed $x_n$ in HMM is only conditioned on the state $q_n$, and the transition probability of states $p(Q|\Theta)$ is independent of observation X. Hence HMM imposes strong assumptions on the independence amongst the observed features x, which the collected features for danger level prediction may not follow. To overcome this limitation, several directions have been explored, including Maximum Entropy Markov Model (MEMM), Input/Output HMM (IOHMM), and Conditional Random Field (CRF). The MEMM and IOHMM have the so called label bias problem where the contribution of certain observations in likelihood computation might be weakened. Hence the CRF algorithm is evalued next for the danger level prediction task.

In Conditional Random Field (CRF) algorithm, the way in which the adjacent q values influence each other is determined by the observed features. Specifically, CRF models the relationship among adjacent pairs $q_{n-1}$ and $q_n$ as an Markov Random Field (MRF) conditioned on the observation X. In other words, the CRF is represented by a set of potentials $M_n(q_{n-1}, q_n | x_n)$ defined as $$M_n(q_{n-1}, q_n | x_n) = \exp\left(\sum_\alpha \lambda_\alpha f_\alpha(q_{n-1}, q_n, x_n) + \sum_\beta \lambda_\beta g_\beta(q_n, x_n)\right)$$

where the $f_\alpha$ are boolean features that encode some information about $q_{n-1}, q_n$ and arbitrary information about $x_n$, and the $g_\alpha$ are boolean features that encode some information about $q_n$ and $x_n$.

The CRF computes the conditional probability $p(X|Q,\Theta)$ according to $$p(X | Q, \Theta) = \frac{\prod_{n=1}^{N} M_n(q_{n-1}, q_n | x_n)}{\left[\prod_{n=1}^{N} M_n(x_n)\right]_{0,N+1}}$$

where $q_0=0$ and $q_{N+1}=N+1$. $M_n(x_n)$ is the $(N+2)\times(N+2)$ matrix of potentials for all possible pairs of labels for $q_{n-1}$ and $q_n$, such that the normalizer becomes a necessary term to make $p(X|Q,\Theta)$ a probability scores.

To apply CRF, the selected state space S contains only $\{s_1=\text{dangerous}, s_2=\text{safe}\}$ two states. The entire feature sequences are fed to the trained CRF model, and a probability score of each feature vector being either of the two state is computed. Then, similar to the HMM based method, a numerical danger level score for each x can be computed as $$DL_t = \log(p(q_t=s_1 | x_t, \Theta)) - \log(p(q_t=s_2 | x_t, \Theta))$$

Figure 3:
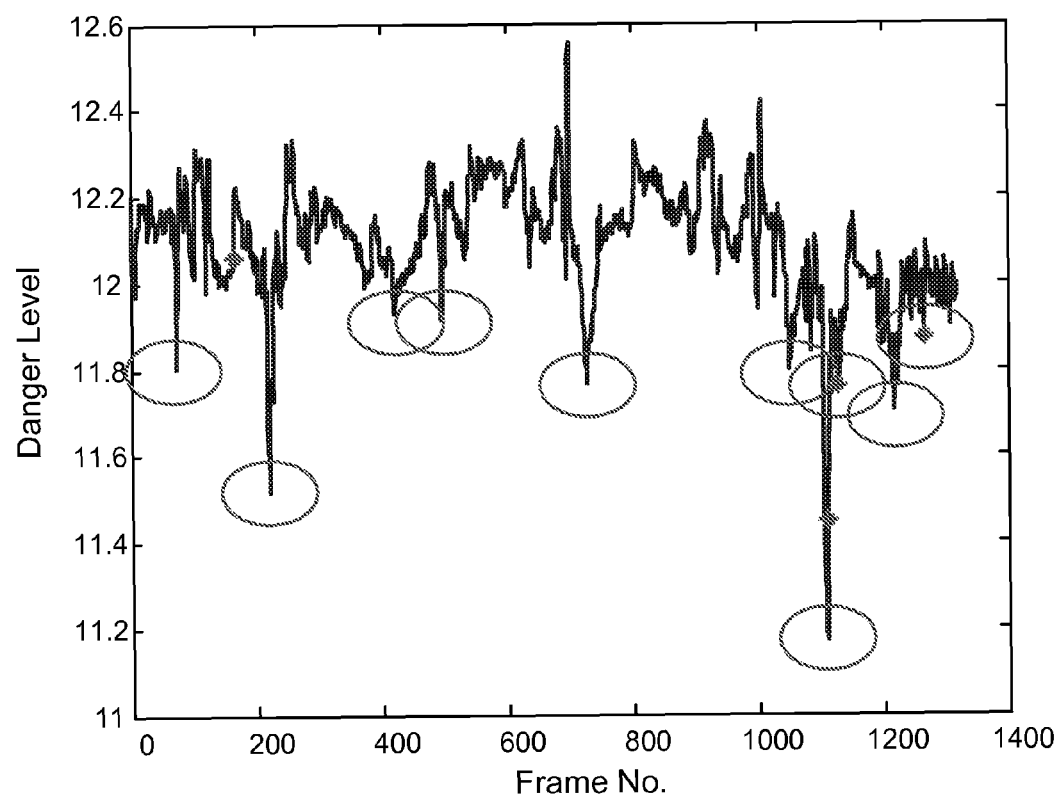
FIG. 3 shows an exemplary danger level curve generated using a Reinforcement Learning method.

FIG. 3 gives a computed danger level curve for the same sequence as that used in FIG. 2. To train the CRF model, algorithms based on iterative scaling and gradient descent have been developed both for optimizing p(Q|X) and also for separately optimizing $p(q_n|x)$ for loss functions that depend only on the individual labels.

The Reinforcement learning (RL) algorithm was originally proposed to solve complex planning and sequential decision making problems under uncertainty. It draws on the theory of function approximation, dynamic programming, and iterative optimization. More importantly, RL combines both dynamic programming and supervised learning to successfully solve problems that neither discipline can address individually.

To apply the RL in the system, a penalty (negative value) is given at the end of the crash sequences while a reward (positive value) given for safe sequences. As these training sequences can be regarded as sparse trajectories in the feature space, the RL could propagates the penalty/reward in the feature space by trial-and-error interactions alone these trajectories, and thus the obtained value function has values in the entire feature space. During prediction, the value function converts a feature vector into a penalty value, which can be used as the danger-level indicator.

The RL usually involves two major tasks, how to select approximation architecture to represent the value function, and how to train the parameters for the selected architecture. In a simple case of RL, the value function can be simply represented by a look-up table and a training algorithm approximates the function by iteratively updating the table. However, as the danger level function takes continuous values and high-dimensional feature space, a look-up table representation would require large memory and long searching time. Therefore, a continuous danger level function $DL_n=DL(x_n,\Theta)$ with parameters $\Theta$ is used to approximate the actual danger level $DL^*(x_n)$ at time instance n.

In RL, the value function $D^*(x_n)$ implicitly gives the maximum probability that the system will collapse from the current state $x_n$. If the transition from state $x_{n-1}$ to $x_n$ incurs a reward $r(x_{n-1}, x_n)$, then $D^*(x_n)$ should satisfy the Bellman's equation $$D^*(x_n) = \min_{x_{n+1}} r(x_n, x_{n+1}) + D^*(x_{n+1})$$

To train the parameters $\Theta$ of the value function J, suppose there are K training trajectories, denoted as $X^i, i=1, \ldots, K$ and each trajectory $X^i$ contains $T_i$ feature vectors. For a single trajectory $X^i=\{x_n^i\}\ n=1, \ldots, T_i$, the actual danger level for at time n should be $D^*(x_n^i)$ and accordingly:

$$D^*(x_n^i) = \sum_{s=n}^{T_i} r(x_s^i, x_{s+1}^i) + R^i$$

where $R^i$ is the penalty/reward given at the end of the $i^{th}$ trajectory. Now the approximated value function can be obtained by solving a least square optimization problem where $$\Theta^* = \underset{\Theta}{\arg\min} \sum_{i=1}^{N} \sum_{n=1}^{T_n} (DL(x_n^j, \Theta) - DL^*(x_n^j))$$

The above least square problem can be solved by an incremental gradient method. In the implementation, one trajectory is considered for each iteration, and $\Theta$ is updated iteratively by $$\Delta\Theta = -\gamma \sum_{n=1}^{T_i-1} \nabla_\Theta DL(x_n^j, \Theta)(DL(x_n, \Theta) - DL^*(x_n))$$

where $[x_1, x_2, \ldots x_T]$ is a trajectory, $\nabla_\Theta DL(x_n^i, \Theta)$ is the partial differentiation with respect to $\Theta$, and $\gamma$ is a step size. $\Delta\Theta$ can be rewritten as $$\Delta\Theta = \gamma \sum_{n=1}^{T_i-1} \nabla_\Theta DL(x_n^j, \Theta) \sum_{s=n}^{T_i-1} d_s$$

where the quantities $d_s$ is called temporal difference and is defined as $$d_s = r(x_s, x_{s+1}) + DL(x_{s+1}, \Theta) - DL(x_s, \Theta)$$

Here $DL(x_{T_i}, \Theta)$ is arbitrarily given as the penalty/reward of that trajectory because $r(x_s, x_{s+1}) + DL(x_{s+1}, \Theta)$, which is a sample of $DL(x_s, \Theta)$, is more likely to be correct because it is closer to $DL(x_{T_i}, \Theta)$.

The temporal difference provides an indication as to whether or how much the estimate $\Theta$ should be increased or decreased. Usually $d_s$ is multiplied by a weight $\lambda^{s-n}$, $0 \leq \lambda \leq 1$ to decrease the influence of farther temporal difference on $\nabla_\Theta DL(x_n^i, \Theta)$. Hence:

$$\Delta\Theta = \gamma \sum_{n=1}^{T_i-1} \nabla_\Theta DL(x_n^j, \Theta) \sum_{s=n}^{T_i-1} d_s \lambda^{s-n}$$

In one implementation, both a linear and non-linear form for $DL(x_n, \Theta)$. Specifically, for a linear danger level function, $$DL(x_n, \Theta) = x_n \Theta$$

and for a non-linear danger level function $$DL(x_n, \Theta) = \sum_{c=1}^{C} \alpha_c \exp\left(-\frac{\|x_n - \mu_c\|^2}{2\sigma^2}\right) + \beta$$

which is a weighted summation of several RBF functions.

Both the two forms of danger level function can be trained. For the linear form, any random initialization of $\Theta$ is applicable because the convergence is guaranteed as long as the it converge. However the initialization is crucial to the quality of the nonlinear function approximation and even the convergence. The $\Theta$ for the non-linear value function includes that the center $\mu$ and the weight $\alpha$ of each RBF as well as the const $\beta$. As all the trajectories for the dangerous training sequences sink to the crash state, an intuitive choice of $\mu$ could be the cluster centers of all the dangerous training samples.

FIG. 3 gives an generated danger level curve for the same sequence used in FIG. 2. More dangerous situations were identified in FIG. 3 as compared to FIG. 2, and the curve is more dynamic which shows that the RL based method is more sensitive to the input. FIGS. 4-9 show additional prediction performance using various combinations of data features.

To evaluate the three algorithms, 14 participants test-drove a "STISIM" simulator. Each subject played 2-3 sessions, and totally 40 sessions were conducted. All participants were familiar with the simulator. Each simulation session last around 20 minutes. The driver's physiological data and visual behavior features as well as the vehicle dynamic parameters were recorded and synchronized.

The system generated a numerical danger-level value for every time instance rather than binary danger/safety classification only. Although this is very desirable for a live prediction system, it is difficult to obtain ground truth labels for every time instance based on speed, respiration rate, etc features. Hence to have objective safe/dangerous evaluation for training, the system collected sequences that ended with crashes as danger samples, and the rest as safe driving samples. All the sequences have the same length (60 seconds in the current setup). Note that such a scheme would bring noises for the safe sample sequences, because there might be dangerous driving patterns that resulted in no crash selected as safe samples. Hence more safe sequences are collected than the crash samples to reduce the influence of such noisy sequences. In such a manner, totally 370 sequences were obtained, 85 as crash sequences, and 285 as safe sequences. To separate the sequences into training/testing partition, the leave-one-out method was used, i.e., in every round, the sessions from one driver were leaved out for testing and the rest for training.

An evaluation metric was used to measure the performance of the system against random guess. The intuitive idea of the metric is to measure how much a predicted accident really occur when the danger level is below a defined threshold. The higher the precision, the better the performance. To illustrate the metric, let the predicted danger time being where the computed danger value is below a threshold, and the threshold is selected in the way that the total predicted danger time would take $\omega$ ($\omega \in (0, 0.2]$ can be regarded as the sensitivity of the predictor) fraction of the sequence length T, hence the predicted danger time adds up to $t_p = \omega \times T$. Let $t_d$ seconds before each crash point till that crash being real danger time, and thus the total real danger time adds up to $t_r$. The prediction precision can then be expressed as $$P(t_d) = \frac{t_p \cap t_r}{t_p}$$

where $t_p \cap t_r$ is the summation of where the predicted danger time is really danger.

Different feature combinations were examined for each algorithm. As the goal is a real-time non-intrusive system, the combinations with $F_3$ were given priority because it's both non-intrusive and sensitive to driving state change. Specifically, the combination of $F_1+F_2+F_3$, $F_1+F_3$ and $F_3$ were evaluated. FIGS. 4-9 shows the particular performance. In each figure, the Y axis represents the ratio between prediction accuracy and random guess, and the X axis is the $\omega$ value ranging from [0, 0.2]. $t_d$ is selected to be 10 seconds.

Figure 4:
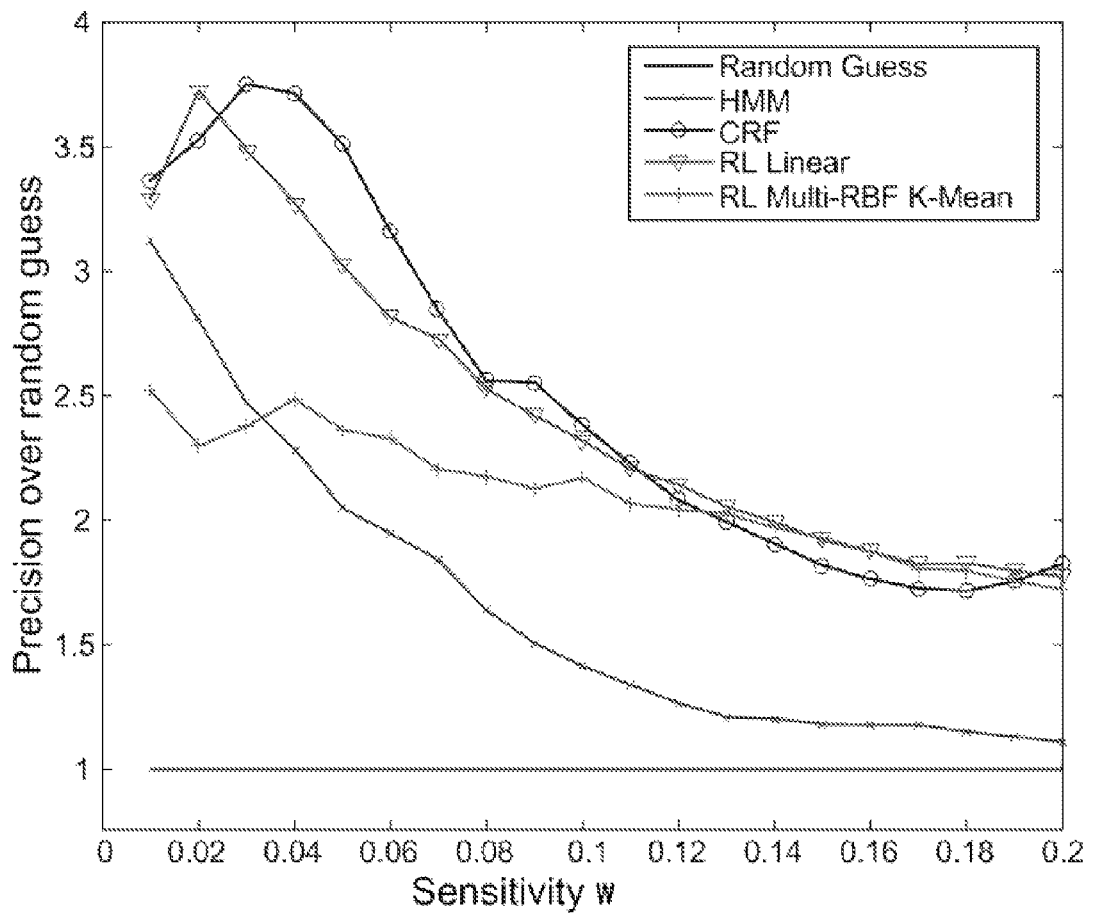
FIG. 4 shows prediction performance using Vehicle's Dynamic parameters where each feature is extracted from 5 seconds long raw input.

FIGS. 4-9 show exemplary prediction performance using one or more sensor inputs. FIG. 4 shows prediction performance using Vehicle's Dynamic parameters (Each feature is extracted from 5 seconds long raw input). As can be seen from FIG. 4, driving danger prediction using only the vehicle dynamic parameters can achieve satisfactory accuracy, and the additional driver's physiological data and behavior feature only improve the performance in a limited extent. Due to the intrusive nature of the driver's physiological data and the large computational expense to achieve accurate driver's visual behavior measurement, the vehicle's dynamic parameter feature is more desirable for driving risk prevention applications. Of the three danger level prediction methods, the Reinforcement Learning algorithms the best performance.

Figure 5:
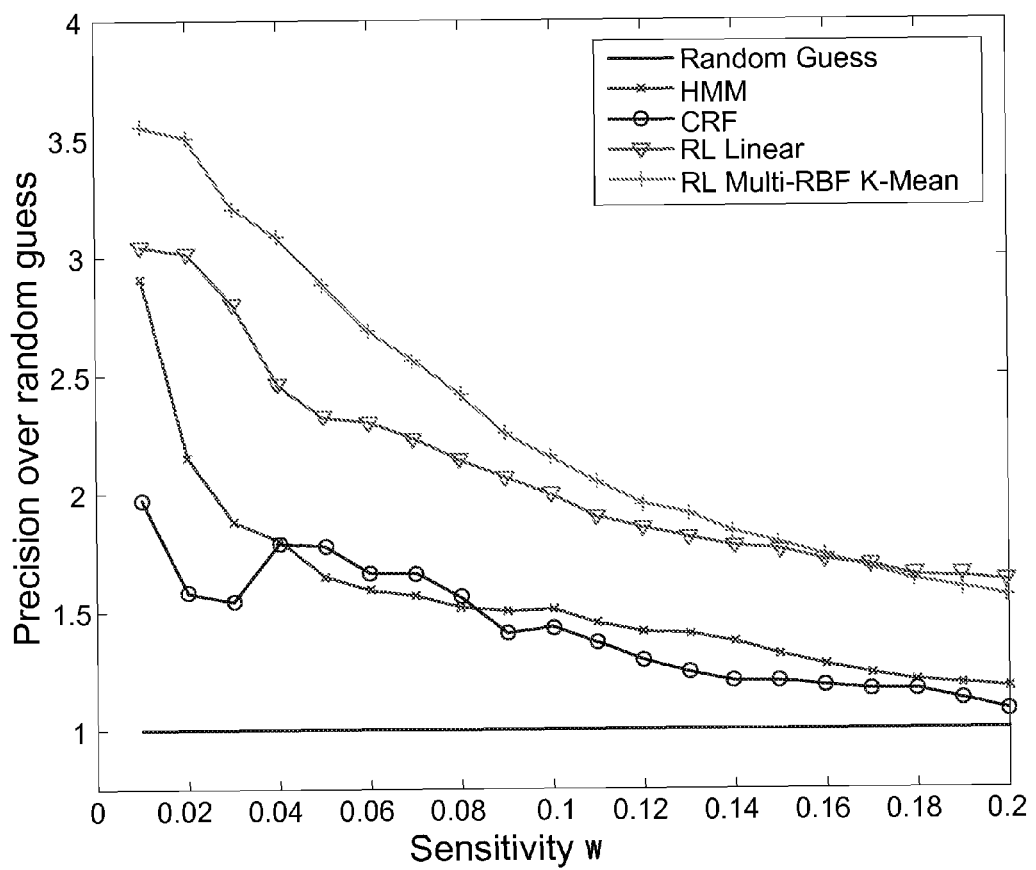
FIG. 5 shows a prediction performance using Vehicle's Dynamic parameters where each feature is extracted from 15 seconds long raw input.
Figure 6:
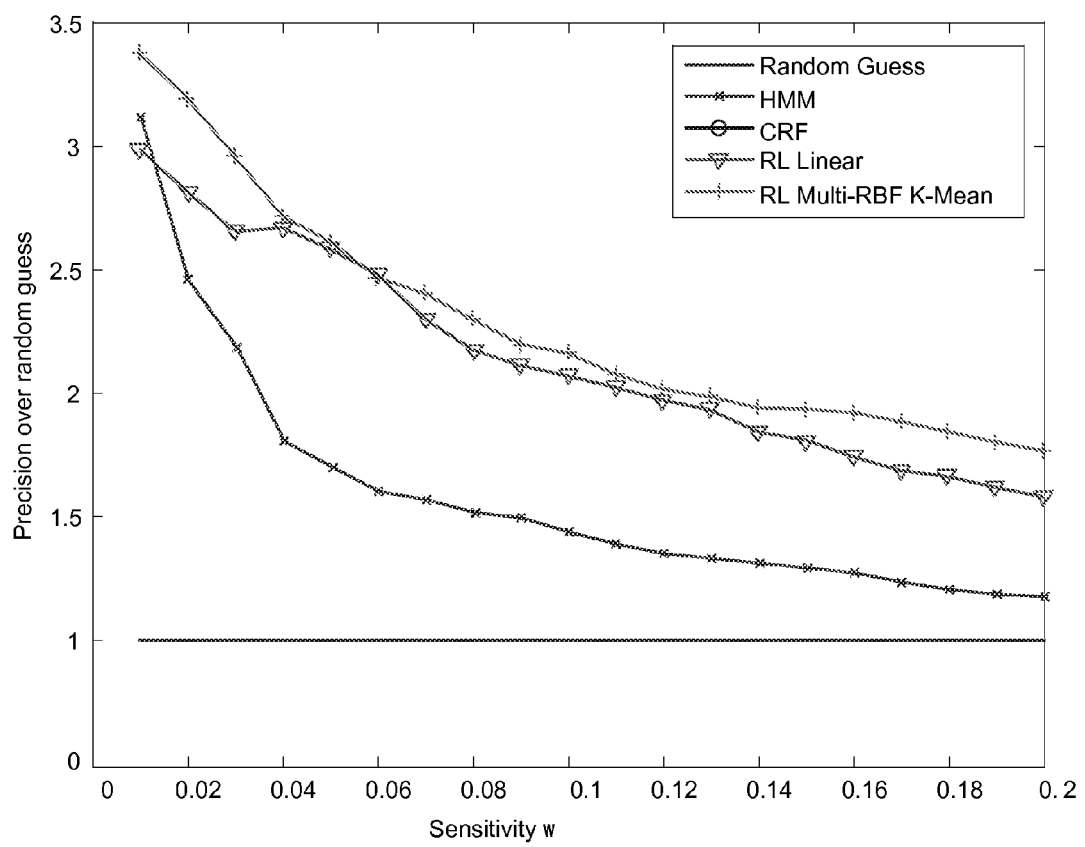
FIG. 6 shows a prediction performance using Vehicle's Dynamic parameters and driver's phyiological data where each feature is extracted from 5 seconds long raw input.
Figure 7:
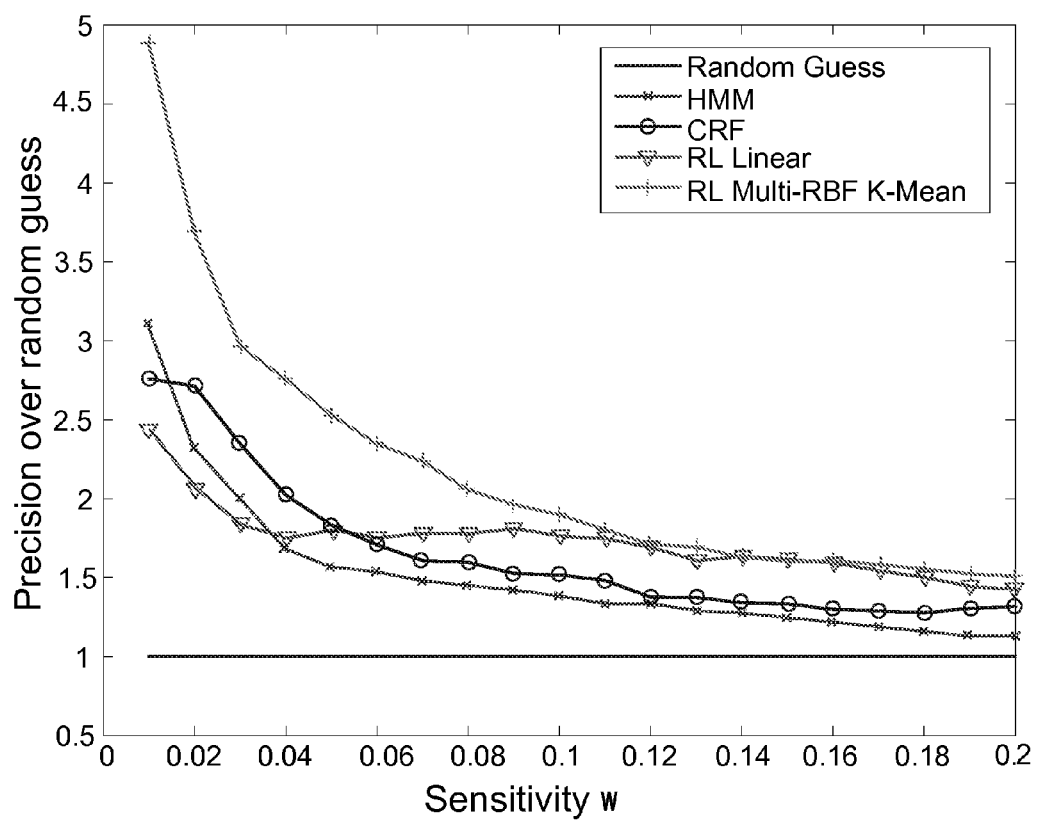
FIG. 7 shows a prediction performance using Vehicle's Dynamic parameters and driver's physiological data where each feature is extracted from 15 seconds long raw input.
Figure 8:
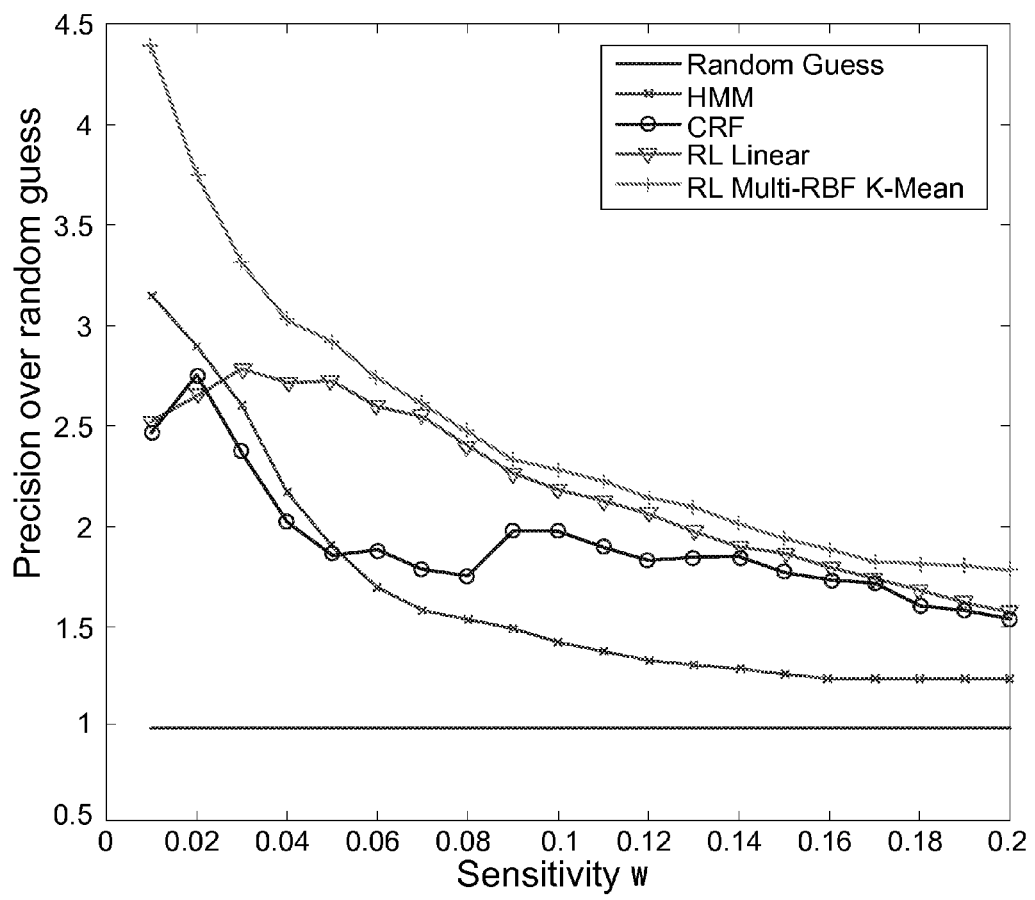
FIG. 8 shows prediction performance using Vehicle's Dynamic parameters, drivers physiological data and driver's visual behavior feature where each feature is extracted from 5 seconds long raw input.
Figure 9:
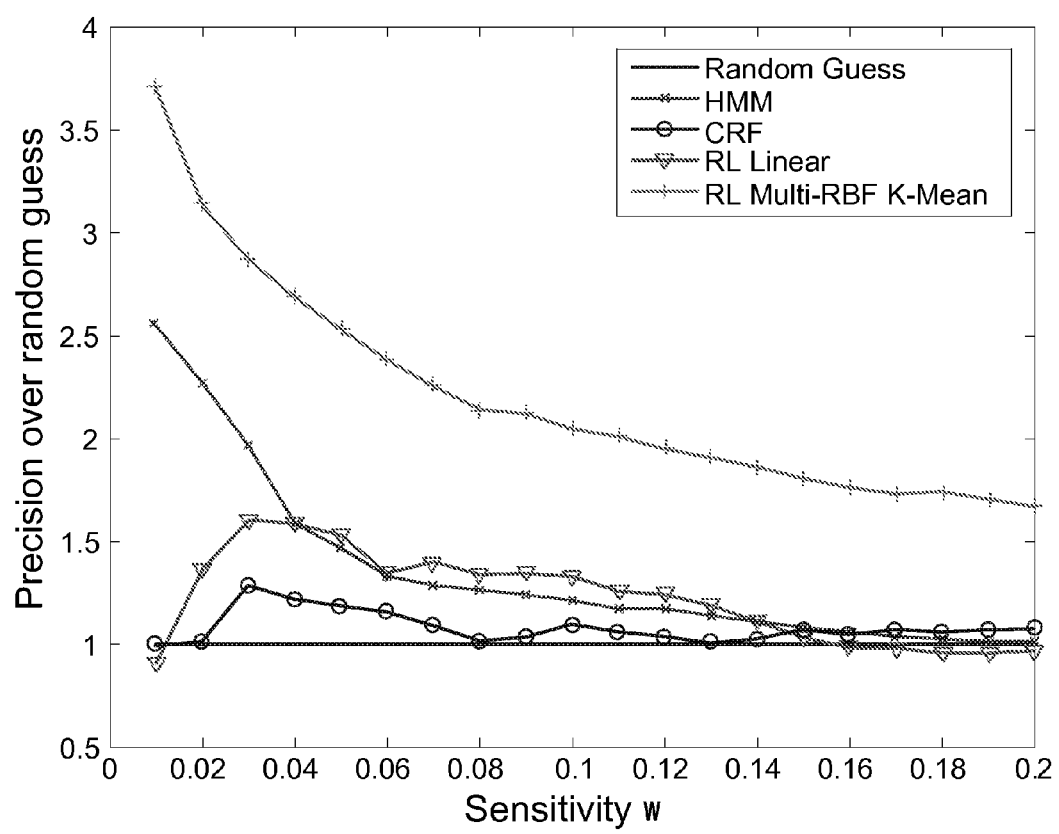
FIG. 9 shows prediction performance using Vehicle's Dynamic parameters, drivers physiological data and driver's visual behavior feature where each feature is extracted from 15 seconds long raw input.

FIG. 5 shows a prediction performance using Vehicle's Dynamic parameters (Each feature is extracted from 15 seconds long raw input). FIG. 6 shows a prediction performance using Vehicle's Dynamic parameters and driver's phyiological data (Each feature is extracted from 5 seconds long raw input). FIG. 6 shows a prediction performance using Vehicle's Dynamic parameters and driver's phyiological data (Each feature is extracted from 5 seconds long raw input). FIG. 7 shows a prediction performance using Vehicle's Dynamic parameters and driver's physiological data (Each feature is extracted from 15 seconds long raw input). FIG. 8 shows prediction performance using Vehicle's Dynamic parameters, drivers physiological data and driver's visual behavior feature (Each feature is extracted from 5 seconds long raw input). FIG. 9 shows prediction performance using Vehicle's Dynamic parameters, drivers physiological data and driver's visual behavior feature (Each feature is extracted from 15 seconds long raw input).

Figure 10:
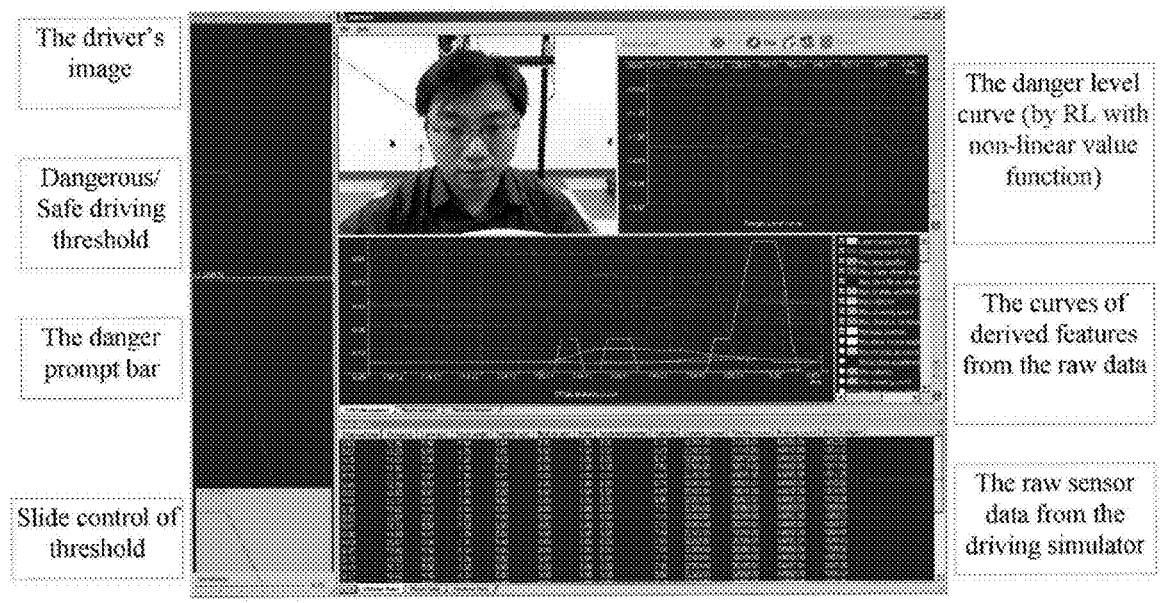
FIG. 10 shows an exemplary user interface for communicating dangerous driving conditions.

Based on the off-line cross validation result, a live driving danger level prediction system was built. It uses only the vehicle's dynamic parameters feature and Reinforcement Learning algorithm with non-linear value function for prediction. FIG. 10 shows a prototype system (the right screen) which works as a add-on to the "STISIM" simulator (the left screen). 11 participants were invited to operate the system. Results shows that the system can predict driving risks due to sharp turning, sudden acceleration/deceleration, continues weaving, approaching object, etc events accurately. It is sensitive to the changes of vehicle's condition resulted from the driver's emotional state change, e.g. fatigue, or the road condition change, e.g. windy and slippery road. However, if the participant wants to crash the vehicle on purpose, such as suddenly turning into the opposite lane to hit the incoming vehicle, the system won't generate an alarm because these types of dangerous situations do not occur in the collected training samples.

An anticipated feedback from the trial is that, when the danger level was above the threshold, the drivers were often unclear about which action caused the risk. Although a precise danger reason probe module is not available at the current stage, it is able to analyze the trained parameters to roughly know which features might be the reason. As mentioned above, the selected non-linear value function for the RL algorithm has 5 RBFs. Their trained weights are {4.0732,1.7731, 2.8959,0.9888,−5.0044} respectively. It can be seen that only the $5^{th}$ RBF has negative weight value, and hence the closer a feature vector is to the $5^{th}$ RBF's center, the more danger it is. Similarly, any feature vector that is close to the $1^{st}$ RBF's center represents safe, as the $1^{st}$ RBF has the greatest positive weight value. In such a manner, the dimension that differs most between the $1^{st}$ and $5^{th}$ RBFs' centers is the most distinguishing feature. Table 4 lists the top-10 features that differ most between safe and crash.

TABLE 4

Top-10 features

| ID | Description |
|---|---|
| 1 | Max distance to object |
| 2 | Mean delta lane position |
| 3 | Min steering count |
| 4 | Mean delta distance to object |
| 5 | Min brakes acceleration |
| 6 | Max velocity |
| 7 | Mean delta steering count |
| 8 | Min throttle acceleration |
| 9 | Min delta throttle acceleration |
| 10 | Max delta brakes acceleration |

Unexpectedly, speed is not among the top 5 reasons for dangerous driving behavior. This is because speeding alone is seldom the direct reason for a crash. When the vehicle is running above 60 mph, for example, it requires greater steering input to make left/right turn. If it resulted in an off-road crash, the steer input angle pattern is learned by the system rather than the speed.

The driver's physiological data, the driver's visual behavior and the vehicle's dynamic parameter features can be used for driving risk prediction by analytic engines such as the Hidden Markov Model, the Conditional Random Field and the Reinforcement Learning (RL) algorithms and the Reinforcement Learning (RL) algorithm with a non-linear value function.

Although a real-time driving danger level prediction system has been discussed above, the inventors contemplate that other systems can be added, including a risk reason analysis method for the driver when potential driving risk has been predicted. The system can incorporate the driver's visual behavior based features to further improve performance. The system can be applied to larger data sets so that more driving safe/dangerous patterns can be modeled. These features improve the reliability of the predictive system and maximizes the users' confidence in the driving risk prediction system.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to predict driving danger, comprising:
    a. capturing vehicle dynamic parameter, driver physiological data and driver behavior feature;
    b. applying a learning algorithm including a statistical model having a continuous danger level function to the features, said training algorithm being learned; and
    c. predicting driving danger with the statistical model in real time including a driving danger level $DL^*(x_n)$ at time instance n with a continuous danger level function $DL_n = DL(x_n, \Theta)$ with parameters $\Theta$ where $$\Theta^* = \arg\min_{\Theta} \sum_{i=1}^{N} \sum_{n=1}^{T_n} (DL(x_n^i, \Theta) - DL^*(x_n^i)).$$

2. The method of claim 1, wherein the learning algorithm includes one of: Hidden Markov Model, Conditional Random Field and Reinforcement Learning.

3. The method of claim 1, wherein the vehicle dynamic parameter includes one or more of: driver's lateral lane position, steering wheel angle, longitudinal acceleration, longitudinal velocity, distance between vehicles.

4. The method of claim 1, wherein the driver's physiological data includes one or more of: respiration, heart rate, blood volume, skin temperature, skin conductance.

5. The method of claim 1, wherein the driver behavior feature comprises a PERCLOSE feature.

6. The method of claim 1, wherein the driver behavior feature comprises fatigue, vision, distraction.

7. The method of claim 1, comprising performing off line cross-validation.

8. The method of claim 1, comprising communicating a reason for a predicted driving danger to a user.

9. The system of claim 1, wherein the learning processor predicts driving danger in real time.

10. The system of claim 1, comprising a display to communicate a reason for a predicted driving danger to a user.

11. A system to predict driving danger, comprising:
    a. a data acquisition unit to capture vehicle dynamic parameter, driver physiological data and driver behavior feature;
    b. a learning processor coupled to the data acquisition unit to process the features and to predict a driving danger level $DL^*(x_n)$ at time instance n with a continuous danger level function $DL_n = DL(x_n, \Theta)$ with parameters $\Theta$ where $$\Theta^* = \arg\min_{\Theta} \sum_{i=1}^{N} \sum_{n=1}^{T_n} (DL(x_n^i, \Theta) - DL^*(x_n^i)); \text{ and}$$

c. a user interface coupled to the learning processor to indicate driving danger.

12. The system of claim 11, wherein the learning processor includes one of: Hidden Markov Model, Conditional Random Field and Reinforcement Learning.

13. The system of claim 11, wherein the vehicle dynamic parameter includes one or more of: driver's lateral lane position, steering wheel angle, longitudinal acceleration, longitudinal velocity, distance between vehicles.

14. The system of claim 11, wherein the driver's physiological data includes one or more of: respiration, heart rate, blood volume, skin temperature, skin conductance.

15. The system of claim 11, wherein the driver behavior feature comprises a PERCLOSE feature.

16. The system of claim 11, wherein the driver behavior feature comprises fatigue, vision, distraction.

17. The system of claim 11, wherein the learning processor is trained using previously captured data.

18. The system of claim 11, wherein the learning processor cross-validates predicted driving dangers.

* * * * *